US012705545B2

(12) United States Patent
Chen et al.

(10) Patent No.: US 12,705,545 B2
(45) Date of Patent: Aug. 11, 2026

(54) OPERATOR PROCESSING METHOD OF DEEP LEARNING FRAMEWORK, DEVICE AND STORAGE MEDIUM

(71) Applicant: Beijing Baidu Netcom Science Technology Co., Ltd., Beijing (CN)

(72) Inventors: Weihang Chen, Beijing (CN); Haifeng Wang, Beijing (CN); Yunfei Zhang, Beijing (CN); Risheng Yuan, Beijing (CN); Tianyu Chen, Beijing (CN); Hongyu Liu, Beijing (CN); Xiaoguang Hu, Beijing (CN); Dianhai Yu, Beijing (CN); Yanjun Ma, Beijing (CN)

(73) Assignee: Baidu Netcom Science Technology Co., Ltd., Beijing (CN)

( * ) Notice: Subject to any disclaimer, the term of this patent is extended or adjusted under 35 U.S.C. 154(b) by 492 days.

(21) Appl. No.: 18/547,090

(22) PCT Filed: Nov. 2, 2022

(86) PCT No.: PCT/CN2022/129228
§ 371 (c)(1),
(2) Date: Aug. 18, 2023

(87) PCT Pub. No.: WO2023/221408
PCT Pub. Date: Nov. 23, 2023

(65) Prior Publication Data

US 2025/0005446 A1 Jan. 2, 2025

(30) Foreign Application Priority Data

May 19, 2022 (CN) ......................... 202210560831.9

(51) Int. Cl.
*G06N 20/00* (2019.01)

(52) U.S. Cl.
CPC .................................. *G06N 20/00* (2019.01)

(58) Field of Classification Search
None
See application file for complete search history.

(56) References Cited

U.S. PATENT DOCUMENTS 11,531,529 B2 12/2022 Zhang et al.
11,625,248 B2 4/2023 Chen et al.
(Continued)

FOREIGN PATENT DOCUMENTS

CN 111666077 9/2020
CN 112149828 12/2020
(Continued)

OTHER PUBLICATIONS

Xiao Dong, Jiasong Wu, Ling Zhou, "How deep learning works—The geometry of deep learning", https://doi.org/10.48550/arXiv.1710.10784, 2017 (Year: 2017).*
(Continued)

*Primary Examiner* — Mehmet Yesildag
(74) *Attorney, Agent, or Firm* — HSML P.C.

(57) ABSTRACT

An operator processing method of a deep learning framework an electronic device, and a storage medium are provided, which relate to a field of computer technology, especially in a field of artificial intelligence technology such as deep learning. The specific implementation scheme includes: acquiring an operator to be processed, where the operator to be processed includes a template parameter independent of the deep learning framework and an operator kernel function; parsing, in response to receiving an input information for the operator to be processed, the template parameter by using the input information to obtain a plurality of complete template parameters related to the deep learning framework; and processing the operator kernel
(Continued)

function according to the plurality of complete template parameters, to obtain an available operator for the deep learning framework.

20 Claims, 6 Drawing Sheets

(56) References Cited

U.S. PATENT DOCUMENTS

| | | | |
|---|---|---|---|
| 2018/0136912 A1 | 5/2018 | Venkataramani et al. | |
| 2019/0370685 A1* | 12/2019 | Xie | H04L 67/303 |
| 2021/0133558 A1* | 5/2021 | Arya | G06N 3/082 |
| 2022/0035614 A1 | 2/2022 | Zhang et al. | |
| 2022/0044769 A1* | 2/2022 | Ramprasad | G16C 20/70 |
| 2022/0230646 A1* | 7/2022 | Xiao | H04L 65/70 |
| 2022/0374238 A1 | 11/2022 | Chen et al. | |
| 2023/0008597 A1* | 1/2023 | You | G06N 3/084 |
| 2023/0065546 A1* | 3/2023 | Ibrahim | G06F 16/24578 |

FOREIGN PATENT DOCUMENTS

| | | |
|---|---|---|
| CN | 113010181 | 6/2021 |
| CN | 113254867 | 8/2021 |
| CN | 113342345 | 9/2021 |
| CN | 113342346 | 9/2021 |
| CN | 114218929 | 3/2022 |
| CN | 114841326 | 8/2022 |
| WO | 2021/190597 | 9/2021 |

OTHER PUBLICATIONS

Research on Hyperparameter Evolutionary Tuning of Deep Neural Network Mode and Its Application, Nanning Normal University, 2017, 62 pages (Abstract provided).

Li et al., "Deep learning nonlinear multiscale dynamic problems using Koopman operator", Journal of Computational Physics, vol. 446, 2021, 19 pages.

Chinese Office Action, issued in the corresponding Chinese patent application No. 202210560831.9, dated Apr. 11, 2023, 6 pages.

International Search Report and Written Opinion, issued in the corresponding PCT application No. PCT/CN2022/129228, dated Feb. 11, 2023, 8 pages.

European Office Action, issued in the corresponding European Patent Application No. 22925241.6, dated Sep. 16, 2025, 9 pages.

Roesch et al., "Relay: A high level IR for Deep Learning", Cornell University, vol. 1, No. 1, Apr. 17, 2019, 41 pages.

Awar et al., "A performance Portability Framework for Python", Proceedings of the ACM International Conference on Supercomputing, vol. 21, Jun. 3, 2021, 12 pages.

European Office Action, issued in the corresponding European Patent Application No. 22925241.6, dated Feb. 26, 2026, 14 pages.

Korean Office Action, issued in the corresponding Korean Patent Application No. 10-2023-7028022, dated Apr. 29, 2026, 26 pages with the translation.

"User's Guide", Sun Microsystems, Inc., Nov. 2025, 451 pages total (submitted in 5 parts due to a large size) available at https://docs.oracle.com/cd/E19422-01/819-3690-10/819-3690-10.pdf Considered only submitted sections in 5 separate documents /M.Y/.

Jens Gustedt, "Preprocessor macros and functions for C99 and C11", Jun. 29, 2020, 7 p. available at https:// gitlab.inria.fr/gustedt/p99.

* cited by examiner

221

The template parameter is iteratively parsed by using the variable parameter list to obtain a plurality of internal template parameters

S2211

A concatenation is performed on the plurality of internal template parameters to obtain the plurality of complete template parameters

S2212

OPERATOR PROCESSING METHOD OF DEEP LEARNING FRAMEWORK, DEVICE AND STORAGE MEDIUM

CROSS-REFERENCE TO RELATED APPLICATION(S)

This application corresponds to PCT Application No. PCT/CN2022/129228, which claims priority to Chinese Patent Application No. 202210560831.9 filed on May 19, 2022, the content of which are incorporated herein in their entireties by reference.

TECHNICAL FIELD

The present disclosure relates to a field of computer technology, in particular to artificial intelligence technologies such as deep learning. More specifically, the present disclosure provides an operator processing method of a deep learning framework, an electronic device and a storage medium.

BACKGROUND

With a development of artificial intelligence technology, a deep learning framework is gradually receiving more and more attention. An evaluation indicator of the deep learning framework includes a scalability of the framework.

SUMMARY

The present disclosure provides an operator processing method of a deep learning framework, a device and a storage medium.

According to an aspect of the present disclosure, there is provided an operator processing method of a deep learning framework, including: acquiring an operator to be processed, where the operator to be processed includes a template parameter independent of the deep learning framework and an operator kernel function: parsing, in response to receiving an input information for the operator to be processed, the template parameter by using the input information to obtain a plurality of complete template parameters related to the deep learning framework; and processing the operator kernel function according to the plurality of complete template parameters, to obtain an available operator for the deep learning framework.

According to another aspect of the present disclosure, there is provided an electronic device, including: at least one processor; and a memory communicatively coupled with the at least one processor: where the memory stores instructions executable by the at least one processor, and the instructions, when executed by the at least one processor, cause the at least one processor to implement the method provided by the present disclosure.

According to another aspect of the present disclosure, there is provided a non-transitory computer readable storage medium storing computer instructions, where the computer instructions are configured to cause a computer to implement the method provided by the present disclosure.

It should be understood that the content described in this part is not intended to identify the key or important features of embodiments of the present disclosure, nor is it used to limit the scope of the present disclosure. Other features of the present disclosure will be readily understood by the following description.

BRIEF DESCRIPTION OF THE DRAWINGS

The accompanying drawings are used for better understanding of the solution and do not constitute a limitation to the present disclosure, in which.

DETAILED DESCRIPTION OF EMBODIMENTS

Figures 1, 2:
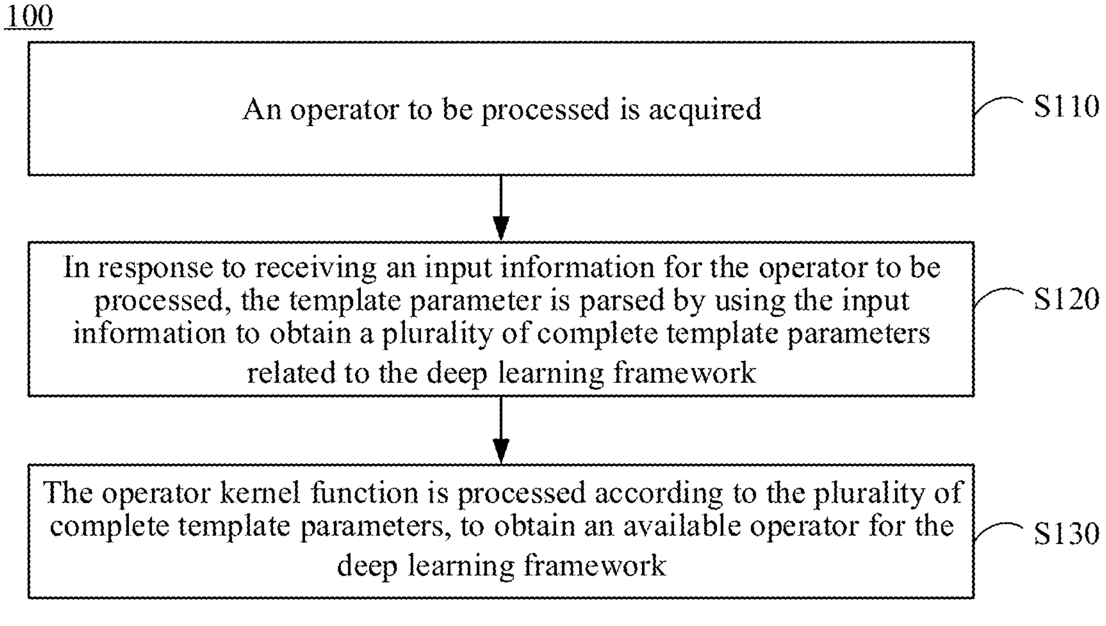
FIG. 1 is a flowchart of an operator processing method of a deep learning framework according to an embodiment of the present disclosure.
FIG. 2 is a flowchart of an operator processing method of a deep learning framework according to an embodiment of the present disclosure.

Exemplary embodiments of the present disclosure will be described below with reference to the accompanying drawings, which include various details of the embodiments of the present disclosure to facilitate understanding and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

The deep learning framework is an infrastructure in a field of artificial intelligence and has entered a relatively mature stage of development. An ability to support upper level expansion and secondary development more efficiently and conveniently is an important indicator for evaluating whether a deep learning framework product may serve as an “infrastructure”, whether a landing of the artificial intelligence industry may be achieved and whether the field may be expanded.

The deep learning framework includes PaddlePaddle framework, PyTorch framework, TensorFlow framework, MindSpot framework, and other multiple niche frameworks. These frameworks may provide similar functionality. However, as a “cornerstone” of ecological construction in an era of artificial intelligence, the deep learning framework needs to attract more upstream developers to join, so that the framework may be further processed and transformed. For this reason, the deep learning framework needs to have characteristics such as clear design, easy maintenance, easy understanding, and easy customization and extension development, in order to reduce a cost of upstream developers to co-build a framework ecology. The operator system may occupy more than half of codes in a framework and serve as a main body of the deep learning framework. A critical part of reducing the cost of co-building the framework ecology is whether the operator system may be expanded and added at a low cost.

Operators are tensor computing units in the deep learning framework. Operators may combine specific tensors as input, complete specific computational logic, and return computational results. The process of building a model using the deep learning framework may be a combination of different operators to meet specific computational logic.

The diversity and richness of operators may serve as important indicators for measuring the deep learning framework. Operators in the deep learning framework may be continuously and dynamically added. There are both connections and differences between different operators. Complex operators may often be achieved through simple operator combination. If the deep learning framework supports this pattern of operator combination implementation, it may help reduce a cost and improve an efficiency, and it may also help attract external developers to carry out secondary development of the framework.

Functions are fundamental paradigms in programming languages. Functions may be called to each other. In order to enable the deep learning framework to have a convenient operator combination development capability, a deep learning framework may be built based on a functional operator system.

The application of functional operator system is relatively limited. There is a contradiction between the function and the operator. For example, the function itself is too simple and lacks an ability to carry information and features. In addition, functions are too flexible, diverse in forms and parameters, and it is difficult to standardize the functions. Operator is a relatively complex concept with feature descriptions that need to be adapted to multiple devices. In addition, as a unified scheduling unit of the framework, the operator needs to abstract a consistent form, so as to be adapted to a global scheduling.

Due to practical considerations, deep learning framework products often make compromise designs, abandon functional paradigms, use a form of "structure+internal computing methods", and sacrifice a convenience of combination multiplexing, so as to maintain a unity of operator paradigm. However, the compromise design may cause a framework maintenance cost and an expansion cost to be increased.

Some deep learning framework products may encapsulate top-level operator functions to shield operator diversity. These deep learning framework products may utilize distribution selection within functions to realize a multiplexing between operators. When multiplexing between operators, these deep learning framework products will generate scheduling overhead for distribution selection, and performances will be suffered. Although these deep learning framework products retain conveniences of multiplexing operator combinations, some performances are sacrificed. If the performances may be improved without performing an operator combination, the method of multiplexing an operator may be abandoned and codes of multiple operator kernels may be directly put together, so as to improve the performance.

Therefore, solving the problem of multiplexing performance between functional operators may persistently leverage advantages of the functional operators.

In order to form an operator system that balances "functional" and "high-performance multiplexing", it is needed to automatically package "functions" with simple and flexible forms into operators with unified forms and descriptive features, so as to achieve "functional" development. It is needed to ensure that no additional scheduling and distribution overhead is introduced when the functional operators are multiplexed, so as to achieve "high-performance multiplexing".

In order to implement a functional operator system, it needs a functional operator paradigm design and a functional operator parsing and registration. The functional operator paradigm design uses a writing method of functions to implement a computational kernel of operator. A core calculation logic of operators is generally written using C++ programming language in functions. The functional operator naturally supports mutual multiplexing between operators. The functional operator parsing and registration is to design key components, automatically package functions with simple and flexible forms into operators with unified forms and descriptive features, so as to provide a unified scheduling for the framework.

In addition, in order to implement a multiplex functional operator system, it is also needed to support multiplexing independent of device between functional operators. When a same operator is applied to different devices, different kernel functions are required. For example, when an operator is applied to the CPU (Central Processing Unit), an operator kernel of CPU is needed, and the GPU (Graphics Processing Unit) has an operator kernel of GPU. Even for functional operators, these two kernels should be different functions. However, when a new operator is developed, which may be implemented by multiplexing other operator combinations, the multiplexed operator needs to be independent of device, otherwise it will cause duplicate development. For example:

assuming there are two operators:

Operator A:

CPU kernel of Operator A: A_CPU( )

GPU kernel of Operator A: A_GPU( )

Operator B:

CPU kernel of Operator B: B_CPU( )

GPU kernel of Operator B: B_GPU( )

For example, a new operator is implemented based on the Operator A and the Operator B.

One implementation method is:

Operator C (implemented by multiplexing Operators A and B):

CPU kernel of Operator C: C_CPU( ) {_CPU( ); B_CPU( );}

GPU kernel of Operator C: C_GPU( ){A_GPU( ); B_GPU( );}

This implementation method has many redundant codes and high maintenance cost, which is not a reasonable functional operator system. In addition, based on this method of multiplexing operators, the operators should be multiplexed by devices, and it is easy to find that implementation codes of operator C for each device kernel is almost the same. The functional operator system is to improve operator multiplexing efficiency, reduce the maintenance cost, and facilitate expansion and development. However, this implementation method in which almost every device kernel requires a copy of the kernel is not a strict functional operator system.

As mentioned above, different deep learning frameworks may include, for example, Pytorch framework, TensorFlow framework and MindSpore framework.

Under the Pytorch framework, operators are ultimately encapsulated into a functional interface, and functional operators may be multiplexed. An operator in Pytorch is implemented in multiple layers, and when an upper layer calls a lower layer, it is needed to search for an operator of a next layer for implementing. Under the PyTorch framework, when multiplexing between operators and within operators, a method of using an operator kernel mapping table to search and select a corresponding kernel is adopted. The cost of this method is relatively heavy, and multiple operator lookups may be required during an execution process of an operator.

Under the TensorFlow framework, operators are still structural operators, not functional operators. The implementation of the operator kernel in a structural form is not intuitive enough, additional concepts are added, and it is needed to introduce more complex writing methods and greater scheduling overhead for multiplexing between operators. Therefore, the design naturally belongs to a form that is not conducive for the development of new operator combinations.

Generally, in the operator system of the structural form, when implementing an operator kernel function, it is needed to additionally define functions, so as to facilitate the multiplexing of the operator kernel function by different operators. This method may achieve a certain degree of generalization, but the maintenance costs are high, a standardized management is difficult, and a long-term development of the framework will result in many redundant codes, thereby gradually increasing the maintenance cost.

In a tensorflow/runtime framework, a derivative of the TensorFlow framework, the operator may be the functional operator. However, the tensorflow/runtime framework is only an experimental product with a small number of operators and is not yet systematic. In addition, an operator parameter list is relatively chaotic, a standardization is poor, and it is impossible to achieve the high-performance multiplexing.

Operators in the MindSpore framework are similar to operators in the TensorFlow framework, which will not be further described.

FIG. 1 is a flowchart of an operator processing method of a deep learning framework according to an embodiment of the present disclosure.

As shown in FIG. 1, the method 100 may include operation S110 to operation S130.

In operation S110, an operator to be processed is acquired.

For example, the operator to be processed includes a template parameter independent of the deep learning framework and an operator kernel function.

For example, the acquired operator to be processed may be a Scale operator. The Scale operator may include an operator kernel function scale_kernel (kernel function of the Scale operator) and a template parameter T. The scale_kernel may perform a scale operation.

For example, the template parameter independent of the deep learning framework may include a template parameter independent of an implementation device of the deep learning framework, and may also include a template parameter independent of a data type of the deep learning framework.

For example, the implementation device may be a CPU or a GPU. For another example, the data type may be Float (floating point) or Int (integer).

For example, in a case of using the Scale operator as the operator to be processed, the operator to be processed may be represented as ScaleKernel<T, Context>( ).

In operation S120, in response to receiving an input information for the operator to be processed, the template parameter is parsed by using the input information to obtain a plurality of complete template parameters related to the deep learning framework.

For example, a complete template parameter may be <Float, CPUContext>. Float is the data type, and CPUContext is the device type.

In operation S130, the operator kernel function is processed according to the plurality of complete template parameters, to obtain an available operator for the deep learning framework.

For example, after acquiring the operator to be processed, the available operator of a specific deep learning framework is obtained through parsing, and the available operator is registered in the deep learning framework, so that other routines or tasks in the deep learning framework may call the available operator to execute a corresponding algorithm or a function, such as scaling, convolution, etc., according to an actual deep learning application.

For example, according to the complete template parameter <Float, CPUContext>, the operator kernel function scale_kernel is processed to obtain the available operator. The available operator may be represented as ScaleKernel<Float, CPUContext>( ).

Through embodiments of the present disclosure, it is possible to achieve high performance multiplexing without scheduling overhead when the operators are multiplexed.

In some embodiments, the method 100 may also include: calling the available operator in response to a calling instruction for the available operator; and performing a functionality of a function corresponding to the available operator by compiling the called available operator.

For example, in response to a calling instruction for the available operator ScaleKernel<float, CPUContext>( ), the available operator ScaleKernel<float, CPUContext>( ) is called; and a functionality of a scale function is executed by compiling the called available operator ScaleKernel<float, CPUContext>( ).

In some embodiments, a declaration of the operator kernel function independent of the implementation device of the deep learning framework may be, for example:

```
template<typename T, typename Context>
void ScaleKernel (const Context& dev_ctx,
  const DenseTensor& x,
  const Scalar& scale,
  float bias,
  bool bias_after_scale,
  DenseTensor * out);
```

The Temlate is a template. The typename T is a template parameter independent of the data type of the deep learning framework. The typename Context is a template parameter independent of the implementation device of the deep learning framework. The typename T and typename Context may not be bound to specific implementation devices.

For another example, the operator Calc multiplexing basic operations may be:

```
template<typename T, typename Context>
void CalcKernel (const Context& dev_ctx,...){
  ScaleKernel<T, Context>(...)
}
```

An operator called by the operator Calc is the operator ScaleKernel<T, Context>( ). The operator ScaleKernel<T, Context>( ) is an operator independent of the implementation device. In a compilation, the template parameters T and Context are obtained and converted to specific data type and implementation device by the compiler. In an example, the operator ScaleKernel<T, Context>( ) may be converted to ScaleKernel<float, CPUContext>( ). In a running stage, the operator Calc may call the float type of the scale operation and an instruction set based on a CPU device, without other logic to make a determination and choices. It is possible to multiplex with non-scheduling overhead and achieve high-performance multiplexing.

In some embodiments, the parsing, in response to receiving an input information for the operator to be processed, the template parameter by using the input information to obtain the plurality of complete template parameters related to the deep learning framework, includes: creating a variable parameter list by using a macro; and iteratively parsing the template parameter based on the variable parameter list, where the input information is used as a macro parameter for the macro.

For example, the macro is a mechanism in C language that may be used to simplify repetitive codes. During compilation pre-processing, the macro is replaced with a corresponding code segment for execution.

For example, for the operator to be processed ScaleKernel<T, Context>( ) mentioned above, the variable parameter list may be determined based on the input information. The macro iteratively parses based on the variable parameter list. In an example, a macro PD_REGISTER_KERNEL may parse the variable parameter list:

```
PD_REGISTER_KERNEL (scale,
  CPU,
  ALL_LAYOUT,
  ScaleKernel,
  float,
  double,
  bfloat16,
  uint8_t,
  int8_t,
  int16_t,
  int,
  int64_t) { }
```

In some embodiments, the variable parameter list includes: a name of the operator to be processed; a name of the operator kernel function; a data layout of the operator kernel function; a device type for implementing the deep learning framework; and a data type for implementing the deep learning framework.

For example, for the Scale operator mentioned above, in the parameter list created by using the macro: scale is the operator name, CPU is the device type for implementing the deep learning framework, ALL_LAYOUT represents that the operator kernel function ScaleKernel may adapt to all data layouts, ScaleKernel represents the name of the operator kernel function to be registered and parsed, and float, double, bfloat16, uint8_t, int16_t, int and int64_t represent the data types supported by the deep learning framework.

In some embodiments, iteratively parsing the template parameter based on the variable parameter list includes: determining a number of parameters included in the macro; determining an end position of an iteration according to the number of the parameters; and iteratively processing the input information according to the end position of the iteration by using the variable parameter list.

For example, for the operator to be processed ScaleKernel<T, Context>( ) mentioned above, when the parameter list is parsed by using the macro PD_REGISTER_KERNEL, another macro PD_NARGS may be used to determine a number of the parameters contained in the macro PD_REGISTER_KERNEL.

For another example, after the number of the parameters is determined, the number of the parameters may be used as a suffix of the macro, so as to concatenate a macro method in a lower level, and call the macro method for parsing.

For example, the macro PD_NARGS may be, for example:

```
#define PD_NARGS(...) _PD_NARGS((_VA_ARGS_,
_PD_RESQ_N( )))
  #define_PD_NARGS(...)_PD_ARG_N (_VA_ARGS_)
  #define_PD_ARG_N_EXPAND (                              \
  _1, _2, _3, _4, _5, _6, _7, _8, _9, _10, _11, _12, _13, _14, _15, N,...)\
    N
  #define_PD_ARG_N (args)_PD_ARG_N_EXPAND args
  #define_PD_RESQ_N( ) 15, 14, 13, 12, 11, 10, 9, 8, 7, 6, 5, 4, 3, 2,
  1, 0
```

For example, for PD_NARGS ( . . . ), the " . . . " may be the variable parameter list mentioned above. Through embodiments of the present disclosure, it is possible to determine how many parameters exist in the macro, so as to determine the end position of the iteration, and iteratively parse the macro parameters from the position corresponding to the number of the parameters.

In other embodiments, the macro PD_NARGS may be nested outside a variable parameter macro_VA_ARGS, so as to perform a relevant processing by the macro PD_NARGS.

For example, the macro PD_NARGS may be nested outside the variable parameter macro_VA_ARGS by:

```
_PD_KERNEL_REGISTRAR_INIT (PD-NARGS (_VA_ARGS_),\
  reg_type,            \
  kernel_name,          \
  backend,             \
  context,           \
  layout,            \
  args_def_fn,          \
```

After the end position of the iteration is determined, the template parameter may be iteratively parsed based on the variable parameter list.

In some embodiments, iterative parsing the template parameter based on the variable parameter list may also include: iteratively parsing the template parameter based on the input information by using the variable parameter list to obtain a plurality of internal template parameters; and performing a concatenation on the plurality of internal template parameters to obtain the plurality of complete template parameters. The following will be explained in detail with reference to FIG. 2.

FIG. 2 is a flowchart of an operator processing method of a deep learning framework according to another embodiment of the present disclosure.

As shown in FIG. 2, a method 221 iteratively parses a template parameter based on a variable parameter list. The following will provide a detailed explanation in conjunction with operation S2211 and operation S2212.

In operation S2211, the template parameter is iteratively parsed by using the variable parameter list to obtain a plurality of internal template parameters.

For example, the iteration may be performed by using a macro VA_ARGS on the macro parameters, so as to iteratively parse the template parameter based on the variable parameter list.

For example, the template parameter may be obtained by iteratively parsing using the variable parameter list:

```
#define_PD_KERNEL_REGISTRAR_INIT_3 (cpp_dtype, . . . )
#define_PD_KERNEL_REGISTRAR_INIT_4 ( . . . )
  _PD_KERNEL_REGISTRAR_INIT_3
    (_VA_ARGS_)
```

For the macro PD_KERNEL_REGISTRAR_INIT_4, the macro parameter " . . . " is the variable parameter list mentioned above. In an example, the macro parameters include: float, double, bfloat16, uint8_t, int8_t, int16_t, int, or int64_t.

The macro PD_KERNEL_REGISTRAR_INIT_3 may be called in the macro PD_KERNEL_REGISTRAR_INIT_4.

The macro PD_KERNEL_REGISTRAR_INIT_3 may be nested outside the macro VA_ARGS for iterating the variable parameter list as a whole. The macro PD_KERNEL_REGISTRAR_INIT_3 may parse a first parameter in the variable parameter list, such as parsing the float. In this case, cpp_dtype may be float, the macro parameter " . . . " of the macro PD_KERNEL_REGISTRAR_INIT_4 may include double, bfloat16, uint8_t, int8_t, int16_t, int, or int64_t. In a next iteration, the double is the first parameter in the variable parameter list.

In operation S2212, a concatenation is performed on the plurality of internal template parameters to obtain the plurality of complete template parameters.

In embodiments of the present disclosure, the plurality of internal template parameters include a plurality of strings.

In embodiments of the present disclosure, performing the concatenation on the plurality of internal template parameters to obtain the plurality of complete template parameters includes: performing the concatenation on the plurality of strings according to the input information, to obtain the plurality of complete template parameters for the operator to be processed.

For example, the parsed internal template parameter is a string. The plurality of strings may include a string Float and a string CPUContext, for example. By performing a concatenation on the two strings, a complete template parameter <Float, CPUContext> may be obtained.

In some embodiments, processing the operator kernel function according to the plurality of complete template parameters, to obtain an available operator for the deep learning framework, includes: for each complete template parameter among the plurality of complete template parameters, determining a function parameter type for the complete template parameter: converting an input information of the complete template parameter into a corresponding parameter information according to the function parameter type; and recording the corresponding parameter information. The following will be explained in detail in conjunction with FIG. 3.

Figure 3:
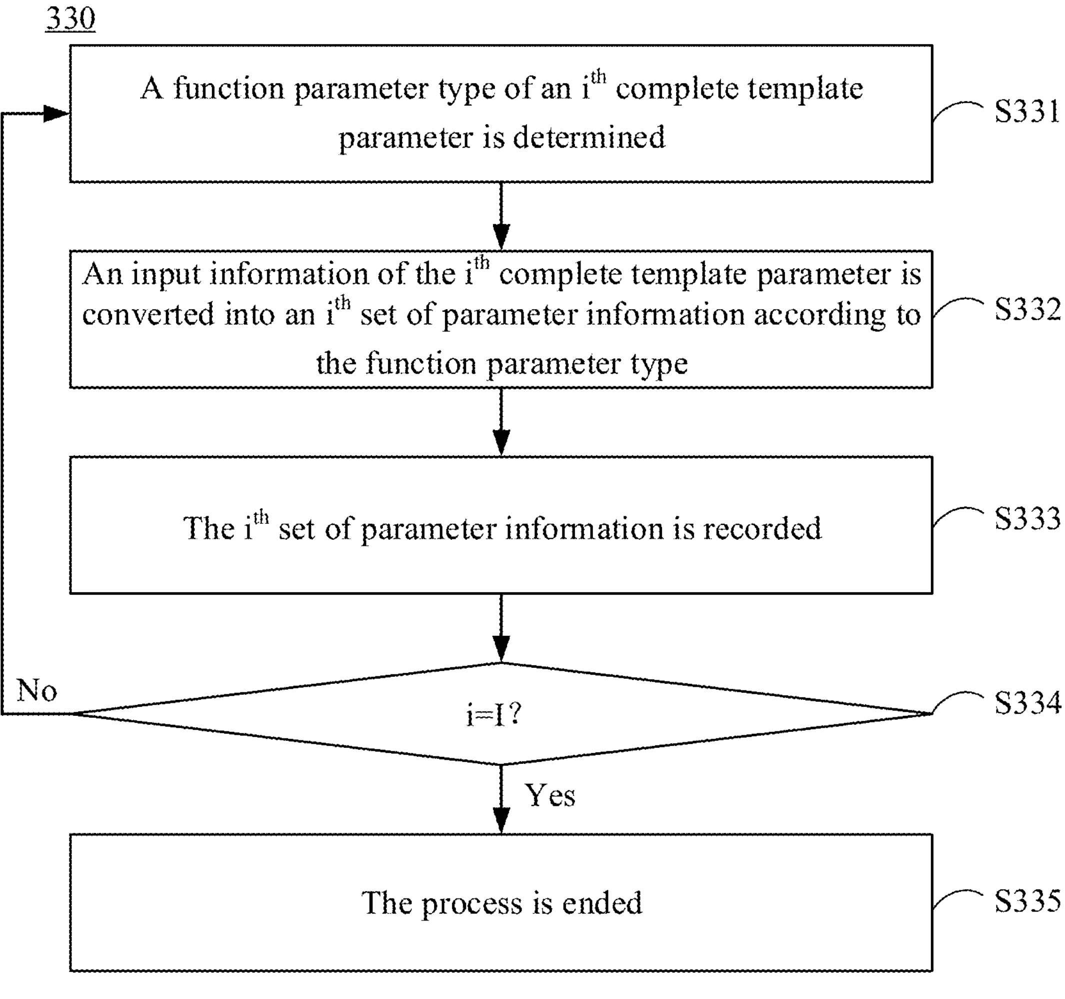
FIG. 3 is a flowchart of an operator processing method of a deep learning framework according to an embodiment of the present disclosure.

FIG. 3 is a flowchart of an operator processing method of a deep learning framework according to an embodiment of the present disclosure.

As shown in FIG. 3, the method 330 may, for example, traverse I complete template parameters, and operation S331 to operation S335 may be performed for an $i^{th}$ complete template parameter, in order to convert an input information of the complete template parameter into a corresponding parameter information. I is an integer greater than or equal to 1, and i is an integer less than or equal to I.

In operation S331, a function parameter type of an $i^{th}$ complete template parameter is determined.

For example, according to the $i^{th}$ complete template parameter, types of some function parameters may be determined as the function parameter type.

In operation S332, an input information of the $i^{th}$ complete template parameter is converted into an $i^{th}$ set of parameter information according to the function parameter type.

For example, different function parameter types may correspond to different conversion methods. A correspondence between the function parameter types and the conversion methods may be preset.

For example, the input information for the operator to be processed mentioned above may include an $i^{th}$ input information corresponding to the $i^{th}$ complete template parameter. The $i^{th}$ input information may include a plurality of function parameters. According to the corresponding function parameter type, the input information may be converted into a corresponding $i^{th}$ set of parameter information.

In operation S333, the $i^{th}$ set of parameter information is recorded.

For example, the $i^{th}$ set of parameter information may be recorded in a memory.

In operation S334, whether i is equal to I is determined.

In a case of i=I, operation S335 is executed to end the process. When i=I, I complete template parameters have been traversed and the process may be ended.

If i is less than I, return to operation S331. For an $(i+1)^{th}$ complete template parameter, operation S331 to operation S334 are performed.

In an example, in a case of 8 data types and 2 device types, through iterative traversal, 16 sets of parameter information may be obtained to support combinations of different device types and different data types.

In an example, for the input information of the $i^{th}$ function mentioned above, the function parameter type of the $i^{th}$ function may be determined, and the type and a related necessary information of the $i^{th}$ function may be recorded. For example, a C++ template meta-programming technology may be used to realize functions such as calculation, determination, conversion, query, etc. during the compiling.

In some embodiments, for example, the method 300 described above may also include: creating an operator to be registered based on the deep learning framework according to the plurality of complete template parameters; and registering the operator to be registered into a global operator table in the deep learning framework.

In the deep learning framework, in order to achieve unified scheduling, the function corresponding to the operators within the deep learning framework may be written in a normalized manner, and there is a significant difference between the normalized writing manner and a writing manner of a calculation function of the operator defined by a user.

For example, in different scenarios, the calculation functions written by different users may be different from each other. For example, when a tensor is used as input, the function is written as follows:

name of an operator calculation function returning a Tensor list (input Tensor1) { . . . }.

If there are two input tensors, the function is written as follows:

name of an operator calculation function returning a Tensor list (input Tensor1, input Tensor2) { . . . }.

When there are more inputs, there will also be more function declarations. In the C++ programming language, different function declarations mean different function pointer types, that is, different data types. The framework needs to store function pointer types that users may write and may be called at a bottom of the framework. This kind of paradigm with strong writing flexibility may not be stored in a simple and general form in the C++ programming language. In order to achieve overall simplicity, it is also required to normalize various calculation functions written by users.

For example, a function form of a custom calculation function is:

name of an operator calculation function returning a tensor list (input Tensor1) { . . . }.

A function form of another custom calculation function is:

name of an operator calculation function returning a tensor list (input Tensor1, input Tensor2) { . . . }.

The function forms of the above two custom calculation functions are not unified. In the embodiment, the different custom calculation functions are normalized, so as to facilitate a unified scheduling within the deep learning framework.

In embodiments of the present disclosure, the operator to be registered includes a description information of the operator to be registered and a kernel function of the operator to be registered, the kernel function of the operator to be registered includes a normalized input information and a normalized function pointer. Creating the operator to be registered based on the deep learning framework according to the plurality of complete internal template functions, includes: for each complete template parameter among the plurality of complete template parameters, determining a structure corresponding to the complete template parameter. where the structure contains a static function, and the static function has a normalized form; determining an input information of the static function as the normalized input information; and determining a function pointer of the static function as the normalized function pointer.

For example, various operators within the deep learning framework may inherit an OpKernel class and fill in their own computational functions (Compute). The corresponding input and output tensors of the operator may be stored in an execution context (ExecutionContext) and obtained through the input and output functions of the execution context. In an example, when the kernel function of the operator to be registered is constructed, the kernel function of the operator to be registered may be constructed based on the function in the normalized form. The normalized function may be a static function in the structure corresponding to the complete template parameters.

For another example, when the kernel function of the operator to be registered is constructed, the method may include: creating the input information of the above static function, creating the function pointer of the above static function, and creating some other standard processing, such as acquiring an input information from context and putting the input information into an inputs variable.

By using a static function with a unified form when the kernel function of the operator to be registered is constructed, the custom calculation functions may be unified, so as to facilitate the unified scheduling of the deep learning framework.

Furthermore, in some embodiments, the input information of the static function forms an input information list, and the input information list includes an input tensor list. The structure includes at least one specialization sub-structure, and the at least one specialization sub-structure respectively has a corresponding data type, where the data type includes a tensor and a non-tensor.

For example, the input of a static function in the normalized form may be an input information list. Furthermore, the input information list may include an input tensor list and a property list. The property list is used to store input variables of other data types. In an example, the data types of input variables include tensor (tensor), integer (int), and floating-point (float), which are represented as tensor1, tensor2, int, and float. The input information list of the static function may include a tensor list (tensor1, tensor2) and a property list (int, float).

For example, the input information list may be obtained using the C++ template parameter derivation mechanism.

Figure 4:
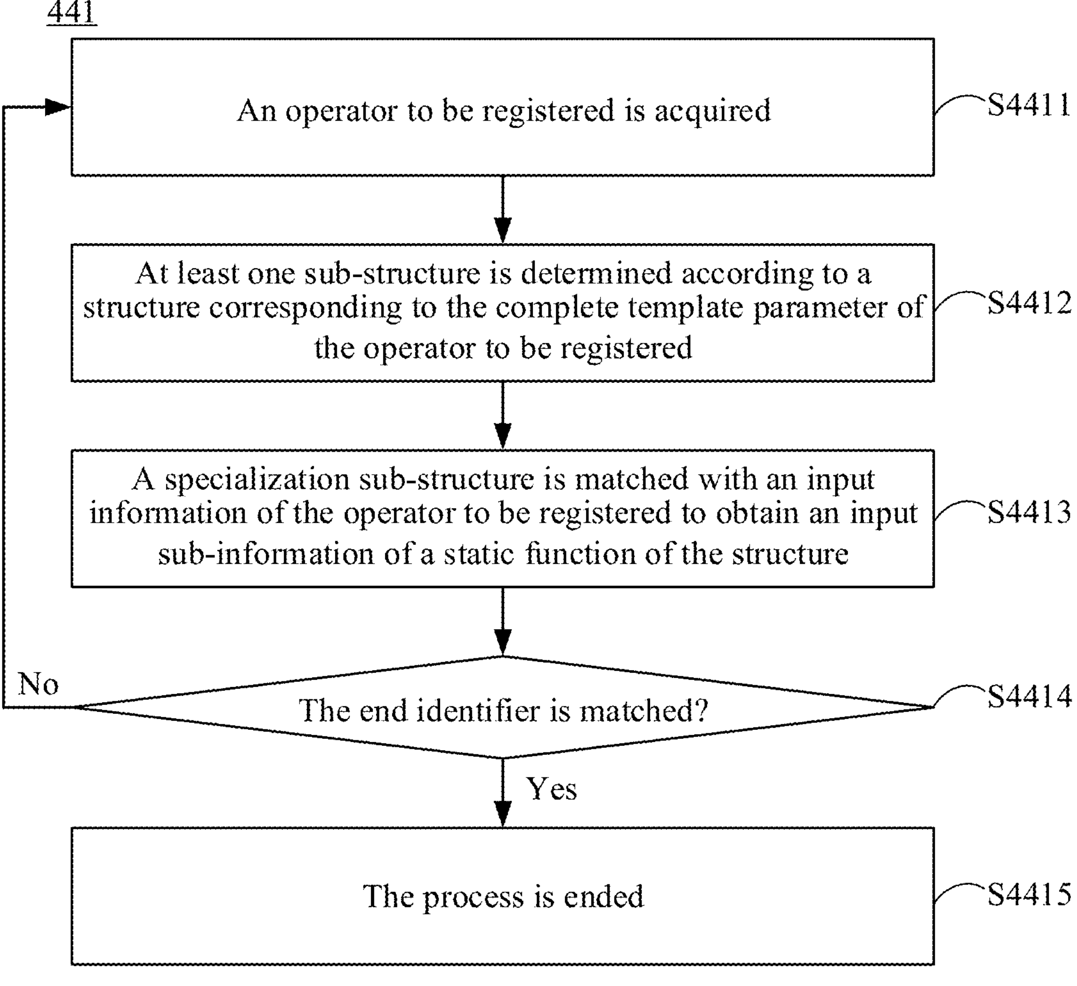
FIG. 4 is a flowchart of an operator processing method of a deep learning framework according to an embodiment of the present disclosure.

The following will provide a detailed explanation of an operator processing method of a deep learning framework according to an embodiment of the present disclosure, in conjunction with FIG. 4.

FIG. 4 is a flowchart of an operator processing method of a deep learning framework according to an embodiment of the present disclosure.

As shown in FIG. 4, a method 441 may normalize input information and a function pointer for an operator kernel function. The following will provide a detailed explanation in conjunction with operation S4411 to operation S4415.

In operation S4411, an operator to be registered is acquired.

For example, the operator to be registered includes a description information of the operator to be registered and a kernel function of the operator to be registered. The description information of the operator to be registered includes an input information of the operator to be registered and an output information of the operator to be registered. The kernel function of the operator to be registered may be used to describe a main computational logic of the operator.

In operation S4412, at least one sub-structure is determined according to a structure corresponding to the complete template parameter of the operator to be registered.

For example, the operator to be registered may be created according to the plurality of complete template parameters. Each complete template parameter may correspond to one structure. The structure may be preset. The structure may take a function return value, a variable function parameter list and a function pointer as the template parameter. A type of the return value of the function pointer is consistent with the type in the parameter list and the template parameter. The structure contains a static function for calculation. The static function has a normalized form.

For another example, the structure may include at least one specialization sub-structure. The specialization sub-structure is used for template parameter derivation.

In operation S4413, a specialization sub-structure is matched with an input information of the operator to be registered to obtain an input sub-information of a static function of the structure.

For example, a specialization implementation of each specialization sub-structure may be preset to match with the structure of the specific data type. The specialization implementation of each sub-structure takes the data type matched with the structure as a first template parameter, and others as remaining template parameter list.

For another example, at least one specialization sub-structure includes a specialization sub-structure with an end identifier. The specialization sub-structure with the end identifier may use the end identifier as the template parameter.

For another example, the specialization sub-structure may contain a static sub-function. The static sub-function takes a parameter index as the template parameter, which may be used to identify which parameter is currently matched to.

In operation S4414, whether the end identifier is matched is determined.

When the end identifier is matched, operation S4415 is performed to end the process.

If the end identifier is not matched, return to operation S4413 and a matching is performed based on a next sub-structure.

For example, during a compilation process, a compiler will parse the input information of the operator kernel function one by one. If the input information currently parsed matches with the first template parameter of the specialization implementation of the defined sub-structure mentioned above, the specialization implementation of the specialization sub-structure will be called to complete a parsing of the current parameter. Next, the remaining input information is continued to be matched with other specialization sub-structures to parse the following input information. When encountering a matching with a specialization sub-structure using the end identifier as the template parameter, the matching is completed.

Furthermore, in some embodiments, a function form with a normalized form may be:

name of an operator calculation function returning a Tensor list (input Tensor list) { . . . }.

Figure 5:
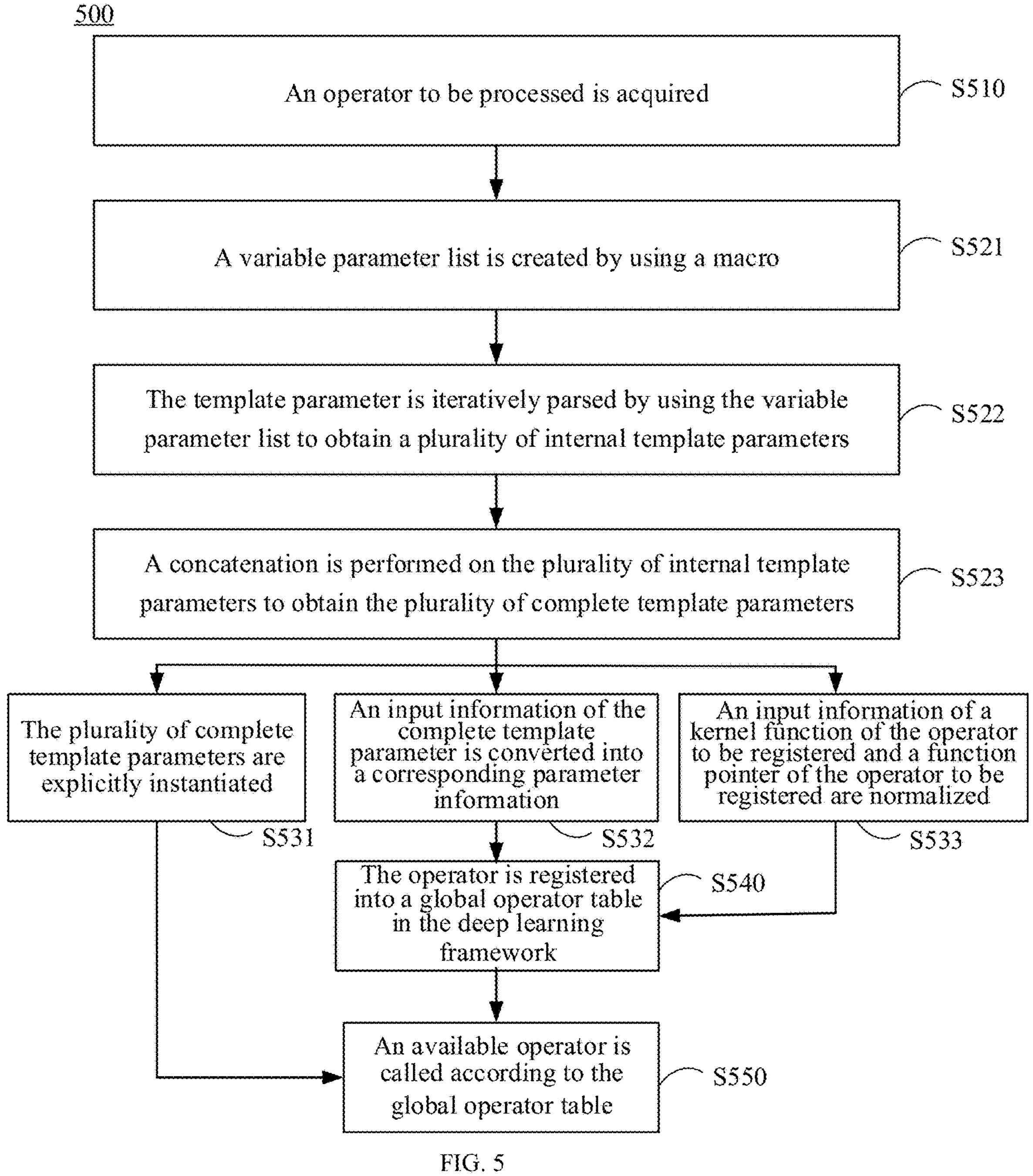
FIG. 5 is a flowchart of an operator processing method of a deep learning framework according to an embodiment of the present disclosure.

FIG. 5 is a flowchart of an operator processing method of a deep learning framework according to another embodiment of the present disclosure.

In operation S510, an operator to be processed is acquired.

For example, the operator to be processed includes an operator kernel function and a template parameter. The template function is independent of the deep learning framework and may be used to distribute the operator to be processed.

Next, the method 500 may parse, in response to receiving an input information for the operator to be processed, the template parameter by using the input information to obtain a plurality of complete template parameters related to the deep learning framework. The following will provide a detailed explanation in conjunction with operation S521 to operation S523.

In operation S521, a variable parameter list is created by using a macro.

In operation S522, the template parameter is iteratively parsed by using the variable parameter list to obtain a plurality of internal template parameters.

In operation S523, a concatenation is performed on the plurality of internal template parameters to obtain the plurality of complete template parameters.

It may be understood that for a detailed description of operation S522 and operation S523, operation S2211 and operation S2212 mentioned above may be referred to, and the present disclosure will not be repeated here.

Next, the method 500 may process the operator kernel function according to the plurality of complete template parameters, to obtain an available operator for the deep learning framework. The following will provide a detailed explanation in conjunction with operations S531, S532 and operation S533.

In operation S531, the plurality of complete template parameters may be explicitly instantiated.

In embodiments of the present disclosure, the plurality of complete template parameters respectively include a template function description information and a template function information.

For example, the template function description information is instantiated into a header file. The template function description information may be a declaration for the template function. The header file may be, for example, an ".h" file.

For example, the template function information is instantiated into a source code file. The template function information may be implemented as the template function. The source code file may be, for example, a ".cc" file.

In the C++ programming language, there are some limitations to the kernel form of applying the template function. In the compilation, the template function needs to be instantiated according to an actual template parameter type, and the implementation of the template function will also be expanded to a corresponding calling position. The template function description information is instantiated to the header file, and the source code file is instantiated to the source code file, so as to avoid introducing a large number of template function code expansions during compilation and affecting compilation efficiency.

In operation S532, an input information of the complete template parameter is converted into a corresponding parameter information.

It may be understood that for a detailed description of operation S532, the method 330 mentioned above may be referred to, and the present disclosure will not be repeated here.

In operation S533, an input information of a kernel function of the operator to be registered and a function pointer of the operator to be registered are normalized.

It may be understood that for a detailed description of operation S533, the method 441 mentioned above may be referred to, and the present disclosure will not be repeated here.

In operation S540, the operator is registered into a global operator table in the deep learning framework.

For example, after operation S532 or operation S533 is performed, information about registering the operator into the global operator table may be acquired. These information may include, for example, a corresponding parameter information of the operator kernel function and/or a normalized function pointer.

In operation S550, an available operator is called according to the global operator table.

In some embodiments, in the source code file mentioned above, the template function may be explicitly instantiated.

For example, in the header file, the template function description information may be:

```
template<typename T, typename Context>
void ScaleKernel (const Context& dev_ctx,
   const DenseTensor& x,
   const Scalar& scale,
   float bias,
   bool bias_after_scale,
   DenseTensor* out).
```

For another example, in the source code file, the explicitly instantiated function ScaleKernel<float, CPUContext> may be:

```
template ScaleKernel<float, CPUContext>(const Context&
CPUContext,
     const DenseTensor& x,
     const Scalar& scale,
     float bias,
     bool bias_after_scale,
     DenseTensor* out).
```

In a case of 8 data types and 2 device types, there may be 16 sets of codes corresponding to the explicitly instantiated function.

In other embodiments, a plurality of instantiation declaration statements may be generated according to the plurality of complete template parameters, as follows:

```
Template decltype (                                    \
kernel function name<data type, device context type>);
```

Here decltype is a method used to automatically parse the function type. In this way, it is possible to improve compilation efficiency and enhance an indirectness of the writing method, thereby automatically completing the explicit instantiation process.

In some embodiments, the global operator table includes: an operator kernel factory class; an operator kernel name class and a kernel key value class; and an operator kernel class. For example, the operator kernel class includes at least one of: a pointer of the operator kernel function; a description information of an input parameter of the operator kernel function; and a description information of an output parameter of the operator kernel function.

Figure 6:
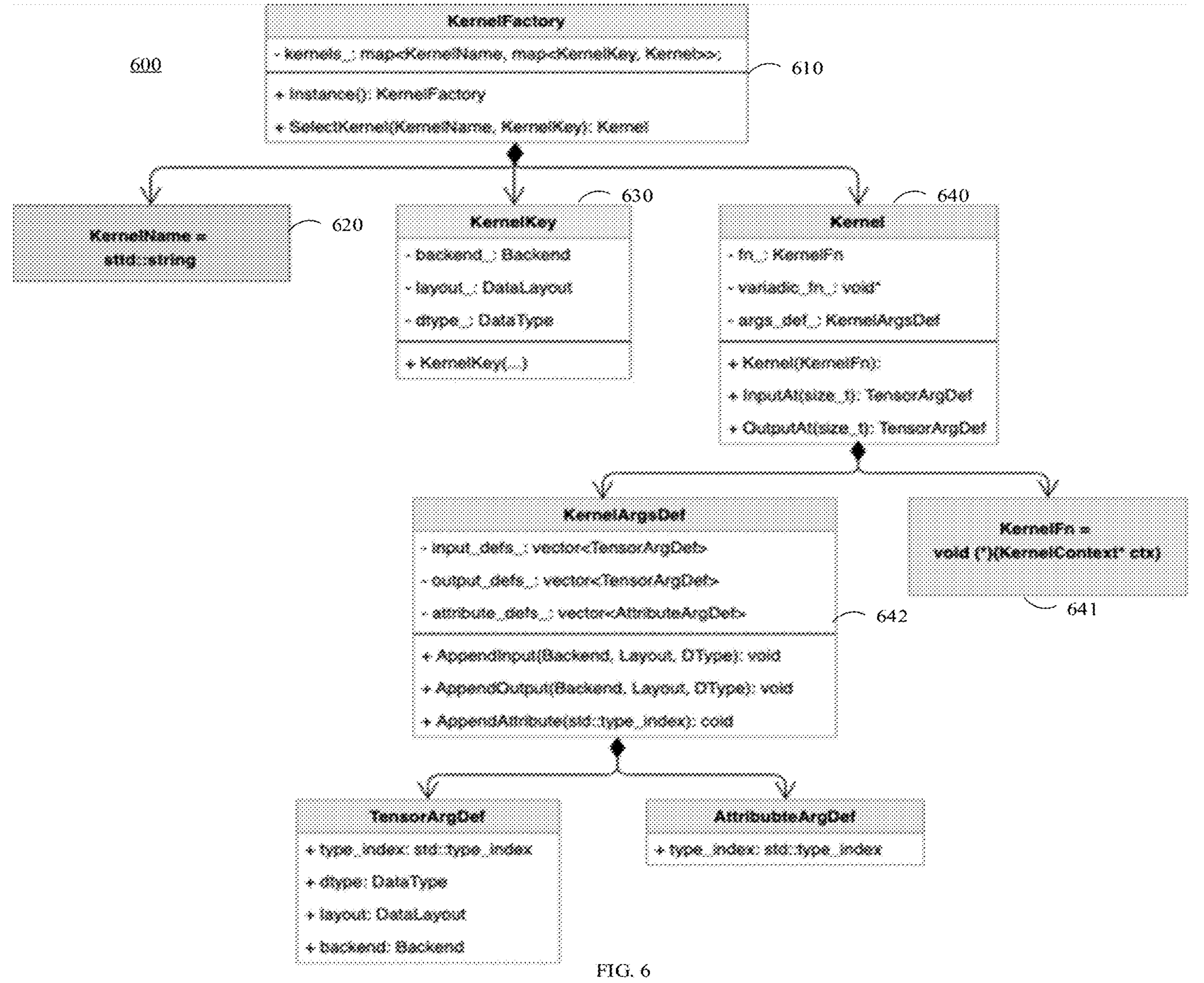
FIG. 6 is an exemplary schematic diagram of a global operator table according to an embodiment of the present disclosure.

The following will provide a detailed explanation of the global operator table in conjunction with FIG. 6.

FIG. 6 is an exemplary schematic diagram of a global operator table according to an embodiment of the present disclosure.

As shown in FIG. 6, a data structure of a global operator table 600 may include an operator kernel factory class 610 in a first level, an operator kernel name class 620, a kernel key value class 630, and an operator kernel class 640 in a second level.

In the example in FIG. 6, the operator kernel class 640 may include a pointer 641 of an operator kernel function and a description information 642 of the operator kernel function parameter in a third level. The description information 642 of the operator kernel function parameter may include, for example, a description information of an input parameter of the operator kernel function and a description information of an output function of the operator kernel function.

In some embodiments, processing the operator kernel function according to the plurality of complete template parameters, to obtain an available operator for the deep learning framework includes: processing the operator kernel function by explicitly instantiating the plurality of complete template parameters, to obtain the available operator for the deep learning framework.

In some embodiments, the plurality of complete template parameters respectively include a template function description information and a template function information; and processing the operator kernel function by explicitly instantiating the plurality of complete template parameters, to obtain the available operator for the deep learning framework includes: instantiating the template function description information into a header file, and instantiating the template function information into a source code file.

Figure 7:
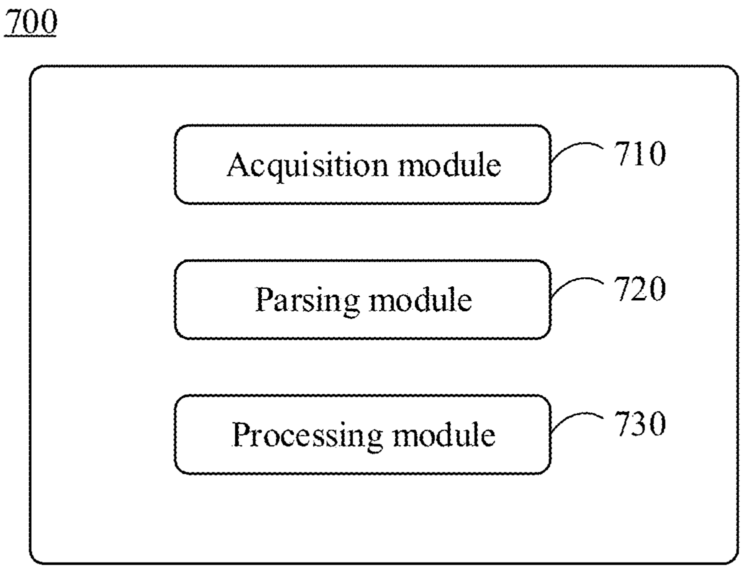
FIG. 7 is a block diagram of an operator processing apparatus of a deep learning framework according to an embodiment of the present disclosure.

FIG. 7 is a block diagram of an operator processing apparatus of a deep learning framework according to an embodiment of the present disclosure.

As shown in FIG. 7, the apparatus 700 may include an acquisition module 710, a parsing module 720 and a processing module 730.

The acquisition module 710 is used to acquire an operator to be processed. For example, the operator to be processed includes a template parameter independent of the deep learning framework and an operator kernel function.

The parsing module 720 is used to parse, in response to receiving an input information for the operator to be processed, the template parameter by using the input information to obtain a plurality of complete template parameters related to the deep learning framework.

The processing module 730 is used to process the operator kernel function according to the plurality of complete template parameters, to obtain an available operator for the deep learning framework.

In some embodiments, the parsing module includes: a creation sub-module used to create a variable parameter list by using a macro; and a parsing sub-module used to iteratively parse the template parameter based on the variable parameter list, where the input information is implemented as a macro parameter of the macro.

In some embodiments, the variable parameter list includes: a name of the operator to be processed: a name of the operator kernel function: a data layout of the operator kernel function: a device type for implementing the deep learning framework; and a data type for implementing the deep learning framework.

In some embodiments, the parsing sub-module includes: a first determination unit used to determine a number of parameters included in the macro: a second determination unit used to determine an end position of an iteration according to the number of the parameters; and a processing unit used to iteratively process the input information according to the end position of the iteration by using the variable parameter list.

In some embodiments, the parsing sub-module also includes: a parsing unit used to iteratively parse the template parameter by using the variable parameter list to obtain a plurality of internal template parameters; and a concatenation unit used to perform a concatenation on the plurality of internal template parameters to obtain the plurality of complete template parameters.

In some embodiments, the plurality of internal template parameters include a plurality of strings; and the concatenation unit includes: a concatenation sub-unit used to perform the concatenation on the plurality of strings according to the input information, to obtain the plurality of complete template parameters for the operator to be processed.

In some embodiments, the processing module includes an explicit instantiation sub-module used to process the operator kernel function by explicitly instantiating the plurality of complete template parameters, to obtain the available operator for the deep learning framework.

In some embodiments, the plurality of complete template parameters respectively include a template function description information and a template function information; and the explicit instantiation sub-module includes: a first instantiation unit used to instantiate the template function description information into a header file; and a second instantiation unit used to instantiate the template function information into a source code file.

In some embodiments, the processing module includes: a first determination sub-module used to determine a function parameter type for the complete template parameter for each complete template parameter among the plurality of complete template parameters: a conversion sub-module used to convert an input information of the complete template parameter into a corresponding parameter information according to the function parameter type; and a recording sub-module used to record the corresponding parameter information.

In some embodiments, the device 700 also includes: a creation module used to create an operator to be registered based on the deep learning framework according to the plurality of complete template parameters; and a registration module used to register the operator to be registered into a global operator table in the deep learning framework.

In some embodiments, the operator to be registered includes a description information of the operator to be registered and a kernel function of the operator to be registered. The kernel function of the operator to be registered includes a normalized input information and a normalized function pointer; and the creation module includes: a second determination sub-module used to determine, for each complete template parameter among the plurality of complete template parameters, a structure corresponding to the complete template parameter, where the structure contains a static function, and the static function has a normalized form: a first normalization sub-module used to determine an input information of the static function as the normalized input information; and a second normalization module used to determine a function pointer of the static function as the normalized function pointer.

In some embodiments, the input information of the static function forms an input information list, the input information list includes an input tensor list; the structure includes at least one specialization sub-structure, each of the at least one specialization sub-structure has a respective corresponding data type, and the data type includes a tensor and a non-tensor.

In some embodiments, the global operator table includes: an operator kernel factory class: an operator kernel name class and a kernel key value class; and an operator kernel class.

In some embodiments, the operator kernel class includes at least one of: a pointer of the operator kernel function: a description information of an input parameter of the operator kernel function; and a description information of an output parameter of the operator kernel function.

In some embodiments, the template parameter independent of the deep learning framework is implemented to distribute the operator to be processed; and the template parameter independent of the deep learning framework includes a template parameter which is independent of an implementation device of the deep learning framework and a data type of the deep learning framework.

In some embodiments, the device 700 also includes: a calling module used to call the available operator in response to a calling instruction for the available operator; and a performing module used to perform a functionality of a function corresponding to the available operator by compiling the called available operator.

In the technical solution of the present disclosure, collecting, storing, using, processing, transmitting, providing, and disclosing etc. of the personal information of the user involved in the present disclosure all comply with the relevant laws and regulations, and do not violate the public order and morals. In the technical solution of this disclosure, the user's authorization or consent is obtained before the user's personal information is acquired or collected.

According to the embodiments of the present disclosure, the present disclosure also provides an electronic device, a readable storage medium, and a computer program product.

Figure 8:
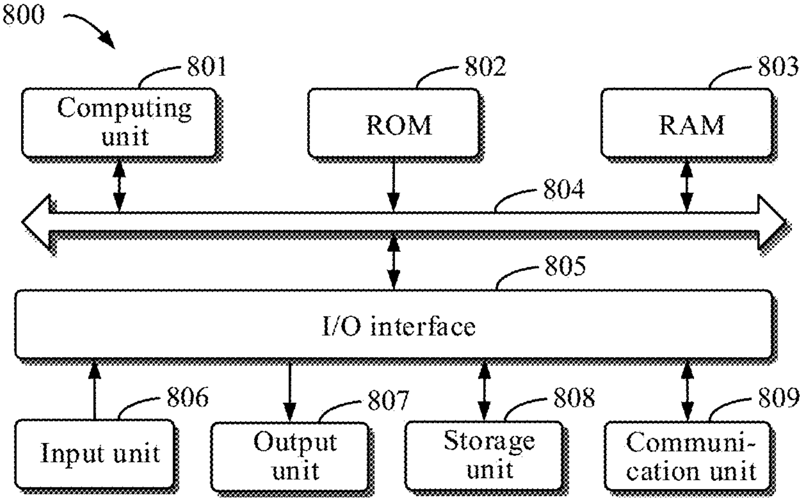
FIG. 8 is a block diagram of an electronic device that may apply an operator processing method of a deep learning framework according to an embodiment of the present disclosure.

FIG. 8 shows a schematic block diagram of an example electronic device 800 that may be used to implement the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 8, the electronic device 800 may include computing unit 801, which may perform various appropriate actions and processing based on a computer program stored in a read-only memory (ROM) 802 or a computer program loaded from a storage unit 808 into a random access memory (RAM) 803. Various programs and data required for the operation of the electronic device 800 may be stored in the RAM 803. The computing unit 801, the ROM 802 and the RAM 803 are connected to each other through a bus 804. An input/output (I/O) interface 805 is further connected to the bus 804.

Various components in the electronic device 800 are connected with I/O interface 805, including an input unit 806, such as a keyboard, a mouse, etc.: an output unit 807, such as various types of displays, speakers, etc.: a storage unit 808, such as a magnetic disk, an optical disk, etc.; and a communication unit 809, such as a network card, a modem, a wireless communication transceiver, etc., The communication unit 809 allows the electronic device 800 to exchange information/data with other devices through a computer network such as the Internet and/or various telecommunication networks.

The computing unit 801 may be various general-purpose and/or special-purpose processing components with processing and computing capabilities. Some examples of the computing unit 801 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 801 may perform the various methods and processes described above, such as the operator processing method of the deep learning framework. For example, in some embodiments, the operator processing method of the deep learning framework may be implemented as a computer software program that is tangibly contained on a machine-readable medium, such as a storage unit 808. In some embodiments, part or all of a computer program may be loaded and/or installed on the electronic device 800 via the ROM 802 and/or the communication unit 809. When the computer program is loaded into the RAM 803 and executed by the computing unit 801, one or more steps of the operator processing method of the deep learning framework described above may be performed. Alternatively, in other embodiments, the computing unit 801 may be configured to perform the operator processing method of the deep learning framework in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server. The server may also be a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. An operator processing method of a deep learning framework, comprising:
 acquiring an operator to be processed, wherein the operator to be processed comprises a template parameter independent of the deep learning framework and an operator kernel function;
 parsing, in response to receiving an input information for the operator to be processed, the template parameter by using the input information to obtain a plurality of complete template parameters related to the deep learning framework; and
 processing the operator kernel function according to the plurality of complete template parameters, to obtain an available operator for the deep learning framework,
 wherein the parsing, in response to receiving an input information for the operator to be processed, the template parameter by using the input information to obtain the plurality of complete template parameters related to the deep learning framework, comprises:
 creating a variable parameter list by using a macro; and
 iteratively parsing the template parameter based on the variable parameter list, wherein the input information is implemented as a macro parameter of the macro,
 wherein the iteratively parsing the template parameter based on the variable parameter list further comprises:
 iteratively parsing the template parameter by using the variable parameter list to obtain a plurality of internal template parameters; and
 performing a concatenation on the plurality of internal template parameters to obtain the plurality of complete template parameters,
 wherein the processing the operator kernel function according to the plurality of complete template parameters, to obtain an available operator for the deep learning framework, comprises:
 for each complete template parameter among the plurality of complete template parameters,
 determining a function parameter type for the complete template parameter;

converting an input information of the complete template parameter into a corresponding parameter information according to the function parameter type; and recording the corresponding parameter information.

2. The method of claim 1, wherein the variable parameter list comprises:

a name of the operator to be processed;

a name of the operator kernel function;

a data layout of the operator kernel function;

a device type for implementing the deep learning framework; and a data type for implementing the deep learning framework.

3. The method of claim 1, wherein the iteratively parsing the template parameter based on the variable parameter list comprises:

determining a number of parameters comprised in the macro;

determining an end position of an iteration according to the number of the parameters; and iteratively processing the input information according to the end position of the iteration by using the variable parameter list.

4. The method of claim 1, wherein the plurality of internal template parameters comprise a plurality of strings; and the performing a concatenation on the plurality of internal template parameters to obtain the plurality of complete template parameters comprises:

performing the concatenation on the plurality of strings according to the input information, to obtain the plurality of complete template parameters for the operator to be processed.

5. The method of claim 1, wherein the processing the operator kernel function according to the plurality of complete template parameters, to obtain an available operator for the deep learning framework, comprises:

processing the operator kernel function by explicitly instantiating the plurality of complete template parameters, to obtain the available operator for the deep learning framework.

6. The method of claim 5, wherein the plurality of complete template parameters respectively comprise a template function description information and a template function information; and the processing the operator kernel function by explicitly instantiating the plurality of complete template parameters, to obtain the available operator for the deep learning framework comprises:

instantiating the template function description information into a header file; and instantiating the template function information into a source code file.

7. The method of claim 1, further comprising:

creating an operator to be registered based on the deep learning framework according to the plurality of complete template parameters; and registering the operator to be registered into a global operator table in the deep learning framework.

8. The method of claim 7, wherein the operator to be registered comprises a description information of the operator to be registered and a kernel function of the operator to be registered, the kernel function of the operator to be registered comprises a normalized input information and a normalized function pointer; and creating the operator to be registered based on the deep learning framework according to the plurality of complete internal template functions comprises:

determining, for each complete template parameter among the plurality of complete template parameters, a structure corresponding to the complete template parameter, wherein the structure contains a static function, and the static function has a normalized form;

determining an input information of the static function as the normalized input information; and determining a function pointer of the static function as the normalized function pointer.

9. The method of claim 8, wherein the input information of the static function forms an input information list, the input information list comprises an input tensor list; the structure comprises at least one specialization sub-structure, and each of the at least one specialization sub-structure has a respective corresponding data type.

10. The method of claim 7, wherein the global operator table comprises:

an operator kernel factory class;

an operator kernel name class and a kernel key value class; and an operator kernel class.

11. The method of claim 10, wherein the operator kernel class comprises at least one of:

a pointer of the operator kernel function;

a description information of an input parameter of the operator kernel function; and a description information of an output parameter of the operator kernel function.

12. The method of claim 1, wherein the template parameter independent of the deep learning framework is implemented to distribute the operator to be processed; and the template parameter independent of the deep learning framework comprises a template parameter which is independent of an implementation device of the deep learning framework and a data type of the deep learning framework.

13. The method of claim 1, further comprising:

calling the available operator in response to a calling instruction for the available operator; and performing a functionality of a function corresponding to the available operator by compiling the called available operator.

14. An electronic device, comprising:

at least one processor; and a memory communicatively coupled with the at least one processor;

wherein the memory stores instructions executable by the at least one processor, and the instructions, when executed by the at least one processor, cause the at least one processor to:

acquire an operator to be processed, wherein the operator to be processed comprises a template parameter independent of the deep learning framework and an operator kernel function;

parse, in response to receiving an input information for the operator to be processed, the template parameter by using the input information to obtain a plurality of complete template parameters related to the deep learning framework; and process the operator kernel function according to the plurality of complete template parameters, to obtain an available operator for the deep learning framework, wherein the at least one processor is further configured to:

create a variable parameter list by using a macro; and iteratively parse the template parameter based on the variable parameter list, wherein the input information is implemented as a macro parameter of the macro, wherein the at least one processor is further configured to:

iteratively parse the template parameter by using the variable parameter list to obtain a plurality of internal template parameters; and perform a concatenation on the plurality of internal template parameters to obtain the plurality of complete template parameters, wherein the at least one processor is further configured to:

for each complete template parameter among the plurality of complete template parameters, determine a function parameter type for the complete template parameter;

convert an input information of the complete template parameter into a corresponding parameter information according to the function parameter type; and record the corresponding parameter information.

15. The electronic device of claim 14, wherein the variable parameter list comprises:

a name of the operator to be processed;

a name of the operator kernel function;

a data layout of the operator kernel function;

a device type for implementing the deep learning framework; and a data type for implementing the deep learning framework.

16. The electronic device of claim 14, wherein the at least one processor is further configured to:

determine a number of parameters comprised in the macro;

determine an end position of an iteration according to the number of the parameters; and iteratively process the input information according to the end position of the iteration by using the variable parameter list.

17. The electronic device of claim 14, wherein the plurality of internal template parameters comprise a plurality of strings; and wherein the at least one processor is further configured to:

perform the concatenation on the plurality of strings according to the input information, to obtain the plurality of complete template parameters for the operator to be processed.

18. The electronic device of claim 14, wherein the at least one processor is further configured to:

process the operator kernel function by explicitly instantiating the plurality of complete template parameters, to obtain the available operator for the deep learning framework.

19. The electronic device of claim 18, wherein the plurality of complete template parameters respectively comprise a template function description information and a template function information; and wherein the at least one processor is further configured to:

instantiate the template function description information into a header file; and instantiate the template function information into a source code file.

20. A non-transitory computer readable storage medium storing computer instructions, wherein the computer instructions are configured to cause a computer to:

acquire an operator to be processed, wherein the operator to be processed comprises a template parameter independent of the deep learning framework and an operator kernel function;

parse, in response to receiving an input information for the operator to be processed, the template parameter by using the input information to obtain a plurality of complete template parameters related to the deep learning framework; and process the operator kernel function according to the plurality of complete template parameters, to obtain an available operator for the deep learning framework, wherein the computer instructions are further configured to cause the computer to:

create a variable parameter list by using a macro; and iteratively parse the template parameter based on the variable parameter list, wherein the input information is implemented as a macro parameter of the macro, wherein the computer instructions are further configured to cause the computer to:

iteratively parse the template parameter by using the variable parameter list to obtain a plurality of internal template parameters; and perform a concatenation on the plurality of internal template parameters to obtain the plurality of complete template parameters, wherein the computer instructions are further configured to cause the computer to:

for each complete template parameter among the plurality of complete template parameters, determine a function parameter type for the complete template parameter;

convert an input information of the complete template parameter into a corresponding parameter information according to the function parameter type; and record the corresponding parameter information.

* * * * *